US008845305B2

(12) United States Patent
Santa

(10) Patent No.: US 8,845,305 B2
(45) Date of Patent: Sep. 30, 2014

(54) VALVE AND DIAPHRAGM FOR A PUMP

(75) Inventor: David Luiz Santa, Toronto (AU)

(73) Assignee: Joe Santa & Associates Pty Limited, Toronto, New South Wales (AU)

( * ) Notice: Subject to any disclaimer, the term of this patent is extended or adjusted under 35 U.S.C. 154(b) by 665 days.

(21) Appl. No.: 12/990,666

(22) PCT Filed: Feb. 20, 2009

(86) PCT No.: PCT/AU2009/000199
§ 371 (c)(1),
(2), (4) Date: Dec. 7, 2010

(87) PCT Pub. No.: WO2009/137862
PCT Pub. Date: Nov. 19, 2009

(65) Prior Publication Data
US 2011/0103984 A1    May 5, 2011

(30) Foreign Application Priority Data
May 16, 2008  (AU) ................................ 2008902425

(51) Int. Cl.
F04B 45/00    (2006.01)
F04B 43/06    (2006.01)
F16K 15/14    (2006.01)
F16K 15/16    (2006.01)
F04B 45/04    (2006.01)
F04B 53/10    (2006.01)
F04B 43/02    (2006.01)
F16K 15/03    (2006.01)

(52) U.S. Cl.
CPC ................. *F04B 43/02* (2013.01); *F04B 45/04* (2013.01); *F04B 53/1042* (2013.01); *F04B 53/1087* (2013.01); *F04B 53/104* (2013.01); *F16K 15/031* (2013.01)
USPC ............ 417/395; 417/559; 137/852; 137/855

(58) Field of Classification Search
USPC .......... 417/393, 395, 472, 559; 137/843, 852, 137/855, 856
See application file for complete search history.

(56) References Cited

U.S. PATENT DOCUMENTS 4,895,494 A  *  1/1990  Gardner ........................ 417/239
5,117,871 A  *  6/1992  Gardner et al. ............... 137/855
5,145,336 A     9/1992  Becker et al.
(Continued)

FOREIGN PATENT DOCUMENTS

DE    20304621    5/2003
NZ    240414    3/1994

OTHER PUBLICATIONS

Examination Report from New Zealand Patent Office dated Apr. 5, 2012.

*Primary Examiner* — Peter J Bertheaud
(74) *Attorney, Agent, or Firm* — Moser Taboada

(57) ABSTRACT

A diaphragm pump (10) having a pump body (11) providing opposing pump chambers (12, 13). Mounted in the body is a piston assembly (14) having pistons (15) joined by a piston rod (16). Each piston (15) is sealingly connected to the body (11) by a diaphragm (22) so that each of the chambers (12, 13) is divided into a first and a second sub-chamber, with the flow of fluid being pumped is governed by a pair of valves (30). Each valve (30) includes a base (31) to which there is movably attached a movable valve member (35).

9 Claims, 5 Drawing Sheets

(56) References Cited

U.S. PATENT DOCUMENTS

| | | | |
|---|---|---|---|
| 5,622,484 A * | 4/1997 | Taylor-McCune et al. | 417/393 |
| 5,699,717 A | 12/1997 | Riedlinger | |
| 5,848,615 A * | 12/1998 | Conti et al. | 137/856 |
| 6,834,678 B2 * | 12/2004 | Santa | 137/852 |

\* cited by examiner

VALVE AND DIAPHRAGM FOR A PUMP

This patent application claims the benefit of Australian Provisional Patent Application No. 2008902425 filed May 16, 2008.

TECHNICAL FIELD

The present invention relates to valves and diaphragms for diaphragm pumps that are operated by a working fluid under pressure.

BACKGROUND OF THE INVENTION

Diaphragm pumps include a pump chamber that is divided by a piston or diaphragm so as to provide a first sub-chamber that receives a working fluid (liquid or gas) under pressure, and a second sub-chamber that receives the fluid being pumped. A working fluid under pressure is delivered to the first sub-chamber to cause reciprocation of the piston and diaphragm to vary the volume of the second sub-chamber and thereby pump a fluid therethrough. These diaphragm pumps have an inlet and an outlet that communicate with the second sub-chamber via one-way valves so that the fluid being pumped passes in a predetermined direction through the pump. A first manifold joins the inlet with the second sub-chamber while a second manifold joins the second sub-chamber with the outlet.

The above manifolds are sealingly connected to the pump body by a means of seal.

The above mentioned one-way valves are mounted on the body.

A disadvantage of the above described pump is that it is typical to sealingly connect the manifolds to the pump body while the one-way valves are separately mounted to engage the associated valve seat.

The above-mentioned diaphragm when performing at pumping action is caused to undergo substantial elastic deformation. A disadvantage of these known diaphragms is that they are prone to failure.

OBJECT OF THE INVENTION

It is the object of the present invention to overcome or substantially ameliorate at least one of the above disadvantages.

SUMMARY OF THE INVENTION

There is firstly disclosed herein a valve for a pump, the valve being integrally formed of plastics material and including:

an elongated base via which the valve is to be mounted in the pump, the base being of a loop configuration so as to have a pair of transversely spaced elongated side portions joined by longitudinally spaced end portions;

a movable valve member located adjacent one of said end portions and configured to sealingly cooperate with a valve seat of the pump to close a valve opening provided by the seat; and a flexible bridge pivotally coupling the movable valve member with said one end portion providing for movement of the valve member by resilient deformation of the bridge.

Preferably, said bridge includes a first bridge portion and a second bridge portion, the bridge portions being transversely spaced.

Preferably, said side portions are substantially co-extensive and said end portions are substantially co-extensive.

Preferably, said end portions are arcuate in configuration.

Preferably, said base in transverse cross-section is arcuate so as to provide a concave surface and a convex surface.

Preferably, said base in transverse cross-section is of a "C" configuration.

Preferably, said bridge provides a pivot axis extending generally transverse relative to said base.

There is further disclosed herein a diaphragm for a diaphragm pump, the pump having a pump body and a pump piston that is reciprocated relative to the body along a longitudinal axis, with said diaphragm being configured to extend between said piston and said body, said diaphragm including:

a base to be fixed to the piston;

a radially outer peripheral portion to be fixed to the body;

a flexible diaphragm portion extending between the base and said peripheral portion, said diaphragm portion having a first set of segments and a second set of segments alternately spaced with respect to the first set segments, the segments each extending angularly about and radially relative to said axis, and wherein the first segments are spaced longitudinally relative to said axis from the second segments.

Preferably, said diaphragm is integrally formed from flexible plastics material.

Preferably, said first segments are attached to said second segments by hinge portions, the hinge portions having a thickness less than thicknesses of the first and second portions to provide for relative movement between the first and second segments by resilient deformation of the hinge portions.

Preferably, said first segments have a thickness greater than the second segments so that the second segments during operation of the diaphragm move relative to the first segments by resilient deformation at and adjacent hinge lines separating the first and second segments.

There is disclosed herein a pump having:

a pump body providing a pump chamber;

a piston movably mounted in the body for reciprocation relative to the body;

a diaphragm sealingly connecting the piston to the body so as to divide said chamber into a first sub-chamber and a second sub-chamber;

first ducting, said first ducting being in communication with said first chamber to provide for the flow of a pumped fluid to and from said first chamber;

second ducting, said second ducting being in communication with said second sub-chamber to provide for the flow of a working fluid to and from said second chamber to cause the reciprocation of said piston;

a first valve in said first ducting and upstream of said first sub-chamber, and a second valve in said first ducting downstream of said first sub-chamber, the first and second valves governing the flow of the pumped fluid to and from said first sub-chamber to cause the pumped fluid to move in a pumped direction; and wherein each valve is a valve as described above.

Preferably, said diaphragm is a diaphragm as described above.

There is still further disclosed herein a pump having:

a pump body providing a pump chamber;

a pump movably mounted in the body for reciprocation relative to the body;

a diaphragm sealingly connecting the piston to the body so as to divide the chamber into a first sub-chamber and a second sub-chamber;

first ducting, said first ducting being in communication with said sub-chamber to provide for the flow of a pumped fluid to and from said first sub-chamber;

second ducting, said second ducting being in communication with said second sub-chamber to provide for the flow of a working fluid to and from said second sub-chamber to cause the reciprocation of said piston;

a first valve in said first said ducting and upstream of said first sub-chamber, and a second valve in said first ducting downstream of said first chamber, the first and second valves governing the flow of the pumped fluid to and from said first sub-chamber to cause the pumped fluid to move in a pumped direction; and wherein said diaphragm is a diaphragm as described above.

BRIEF DESCRIPTION OF THE DRAWINGS

A preferred form of the present invention will now be described, by way of an example only, with reference to the accompanying drawings wherein.

DETAILED DESCRIPTION OF THE PREFERRED EMBODIMENTS

Figure 1:
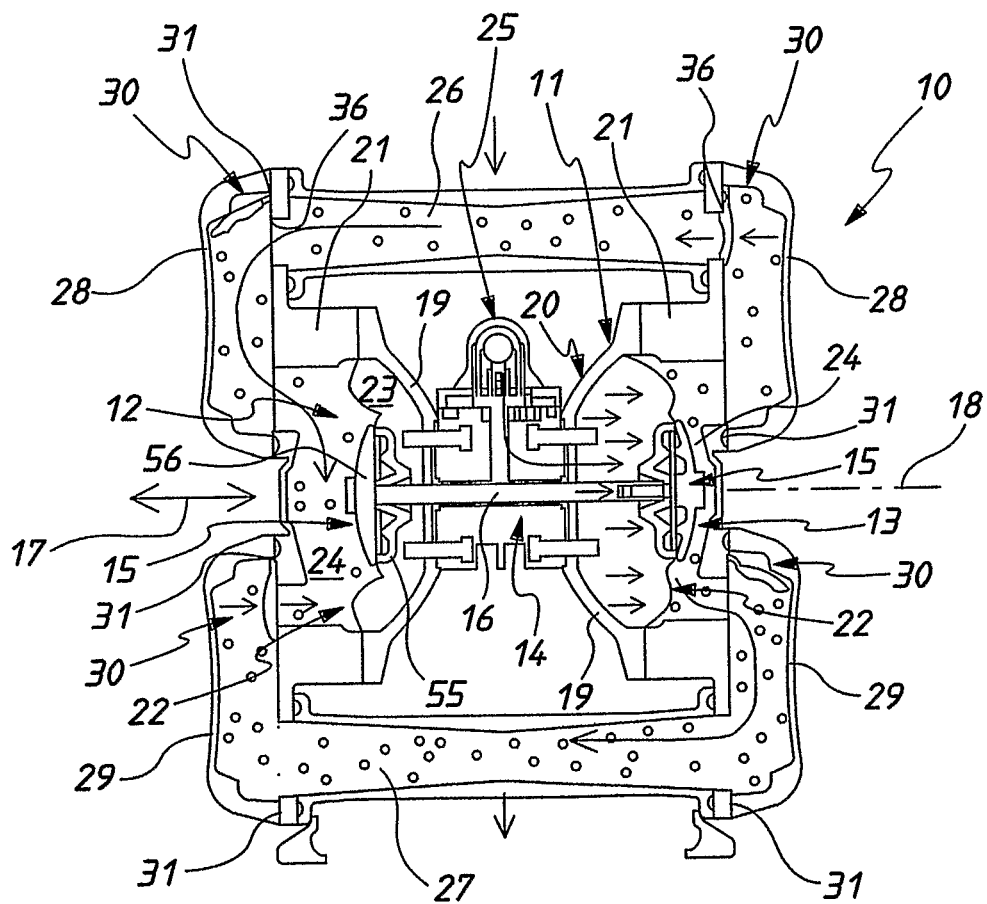
FIG. 1 is a schematic sectioned side elevation of a diaphragm pump.
Figure 2:
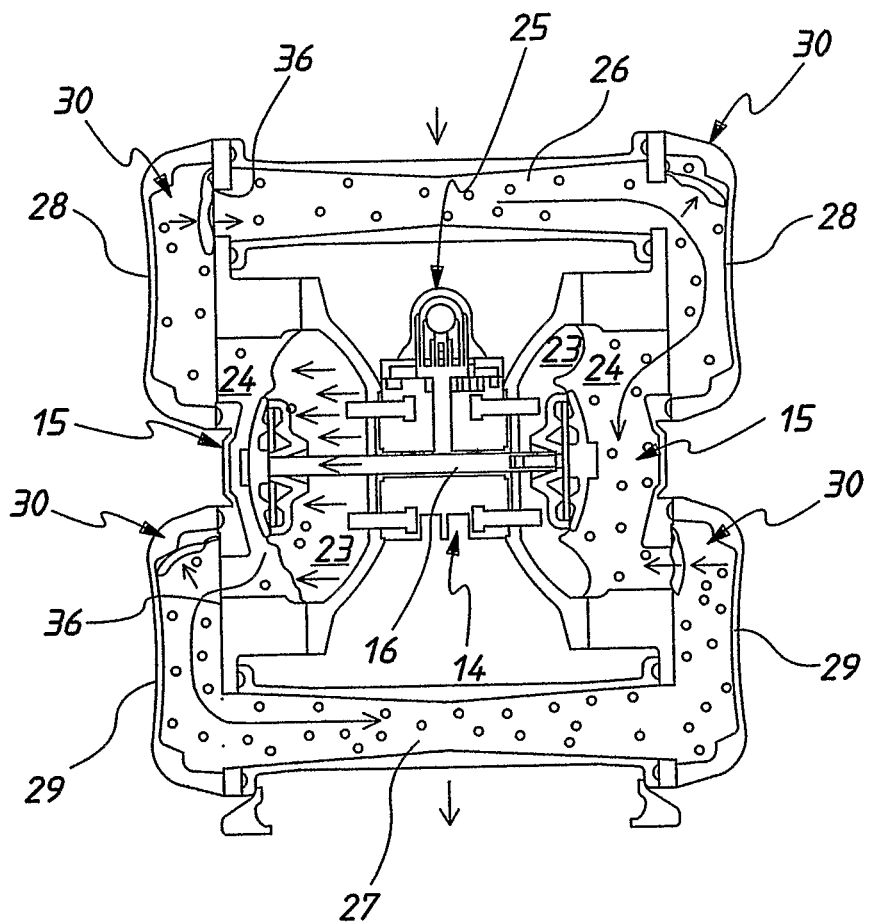
FIG. 2 is a schematic further sectioned side elevation of the pump of FIG. 1.

In the accompanying drawings, there is schematically depicted a diaphragm pump 10. The pump 10 includes a pump body 11 that provides a pair of opposed pump chambers 12 and 13. Mounted in the body 11 is a piston assembly 14 providing a pair of pistons 15 joined by a transverse piston rod 16 so that the pistons 15 are caused to reciprocate in unison linearly in the direction 17 along the axis 18. The piston rod 16 and pistons 15 have as their longitudinal axis the longitudinal axis 18. The body 11 includes a base 20 providing a pair of cup portions 19. Secured to each cup portion 19 is a sleeve 21, with the cup portions 19 and associated sleeves 19 cooperating to provide the chambers 12 and 13.

The piston rod 16 is slidably mounted in the cup portions 19.

Fixed to each piston 15 is a diaphragm 22 that together with the associated piston 15 divides the respective chamber 12 or 13 into a first sub-chamber 23 and a second sub-chamber 24. A working fluid (liquid or gas) under pressure is alternately delivered to the sub-chambers 23 to cause reciprocation of the piston assembly 14. Accordingly the pump 10 could be hydraulically or pneumatically driven.

Schematically depicted is a control valve 25 and associated ducting that delivers the working fluid to the sub-chambers 23 and provides for drainage of the working fluid therefrom as the chambers 23 are varied in volume.

The pump 10 has an inlet 26 to which a fluid being pumped is delivered, and an outlet 27 to which the fluid being pumped is delivered under pressure by the pump 10. The inlet 26 communicates with both sub-chambers 24 while the outlet 27 also communicates with both sub-chambers 24. More particularly, the inlet 26 is joined to the sub-chamber 24 by a manifold 28. While each outlet 27 is joined to the sub-chamber 24 by a manifold 29.

To ensure that the fluid being pumped passes in a predetermined direction through the pump 10 there is provided one-way valves 30.

Figures 3, 4:
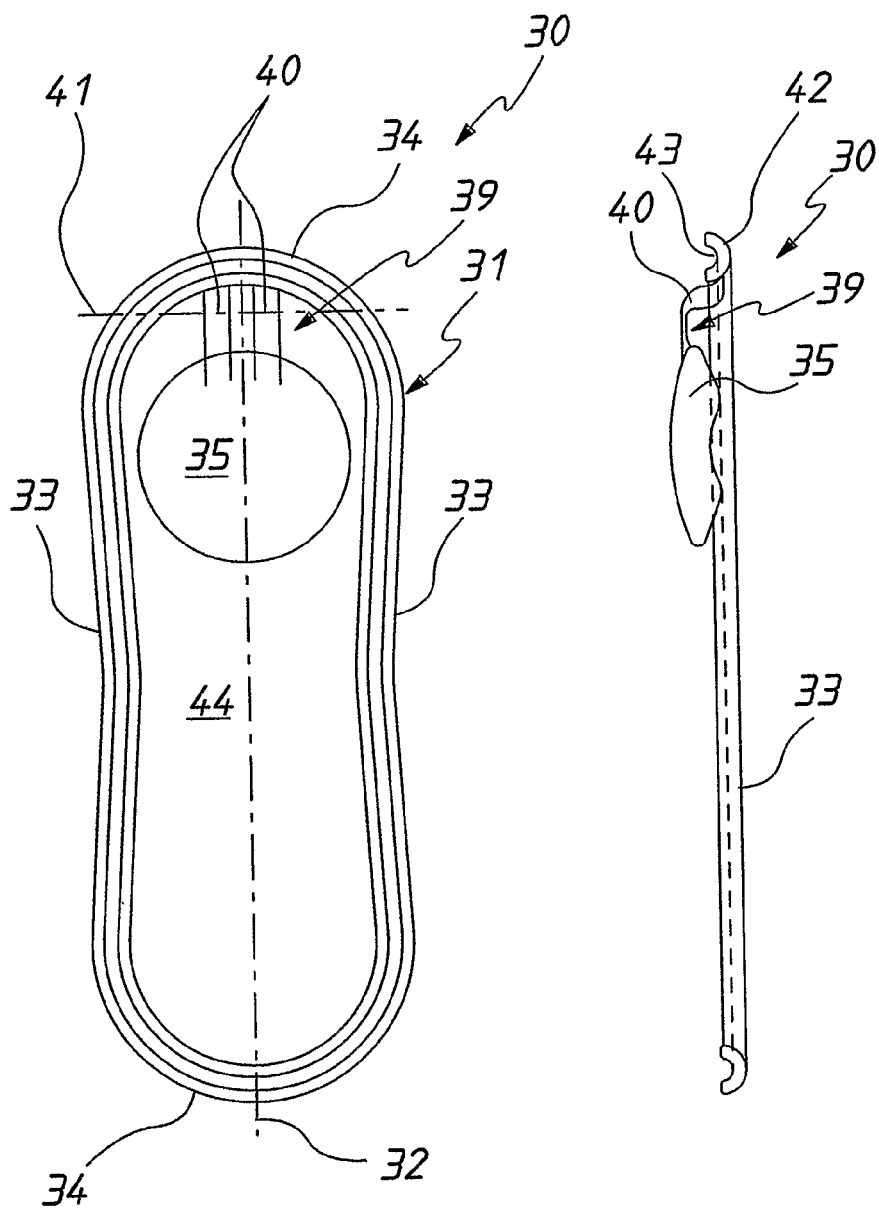
FIG. 3 is a schematic plan view of a valve employed in a pump of FIG. 1.
FIG. 4 is a schematic sectioned side elevation of the valve of FIG. 3.
Figure 5:
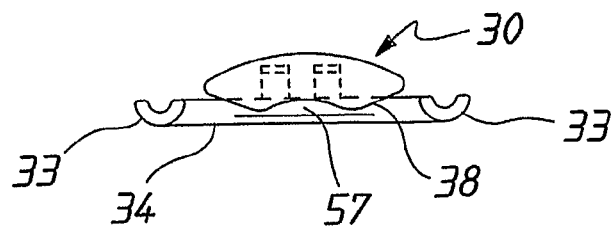
FIG. 5 is a schematic sectioned end elevation of the valve of FIG. 3.

One of the one-way valves 30 is best seen in FIGS. 3 to 5. Each one-way valve 30 is integrally formed of resilient plastics material and provides for the control of fluid being pumped through the valve 10 while also sealingly connecting the associated manifold 28/29 with the body 11. Each valve 30 includes an elongated base 31 that has a longitudinal axis 32. The base 31 has a pair of longitudinally extending side portions 33 that are substantially co-extensive and are transversely spaced relative to the axis 32. Joining the side portions 33 are end portions 34 that are spaced longitudinally relative to the axis 32 and extend generally transverse of the axis 32. Each end portion 34 is generally arcuate in configuration.

The base 31 provides a seal between the associated manifold 28 and sleeve 21.

Each valve 30 further includes a movable valve member 35 that is caused to move relative to an associated valve seat 36 (provided by the body 11) providing a valve opening 37. In particular, each member 35 is caused to move between an opened position providing for flow through the associated valve opening 37, and a closed position preventing flow through the valve opening 37 in the reverse direction.

Each valve member 35 is generally circular in configuration and has an annular convex surface 38 that engages the associated valve seat 36. Generally centrally of the valve member 35 and surrounded by the surface 38 is a depression 57. When the valve member 35 is in an open position, the depression 57 aids in providing a bigger aperture for fluid flow. Each member 35 is attached to an adjacent end portion 34 by a bridge 39. By resilient deformation of the bridge 39 the member 35 is able to move relative to the associated valve seat 36. Each bridge 39 includes a pair of transversely spaced elongated bridge portions 40 that extend generally parallel to the axis 32 and provide for angular movement of the valve member 25 about a transverse axis 41.

Preferably, the base 31 in transverse cross-section is arcuate, and more particularly is of a "C" configuration. Accordingly, the base 33 provides a convex surface 42 and a convex surface 43.

As best seen in FIG. 3 the base 33 is a closed loop surrounding an aperture 44 within which the member 35 is located.

The diaphragm 22 is illustrated in FIGS. 6, 7, 8 and 9.

The diaphragm 22 includes a central base 45 that is of an annular configuration so as to provide a central aperture 46. The base 45 has a plurality of ribs 47 that aid in securing and sealing the diaphragm 22 to the associated piston 15. In particular, the base 45 extends radially from and angularly about the axis 18 and is generally planar. The base 45 is of an annular configuration so that its longitudinal axis is also the axis 18.

The diaphragm 22 has a peripheral portion 48 fixed to the body 20. Extending between the base 45 and periphery 48 is a diaphragm portion 49. The diaphragm portion 49 is also annular and has first radially and angularly extending segments 50 and second radially and angularly extending segments 51. The segments 51 are further displaced from the base 45 in the direction of the axis 18 than the segments 50.

The segments 50 have a greater width 52 than the corresponding width 53 of the segments 51. The segments 50 and 51 are joined by hinge portions 54 that separate the segments 50 and 51. The hinge portions 54 provide for relative movement between the segments 50 and 51 by resilient deformation of the hinge portions 54. This relative movement is provided by resilient deformation of the diaphragm portion 49 adjacent the hinge lines 54.

Figure 6:
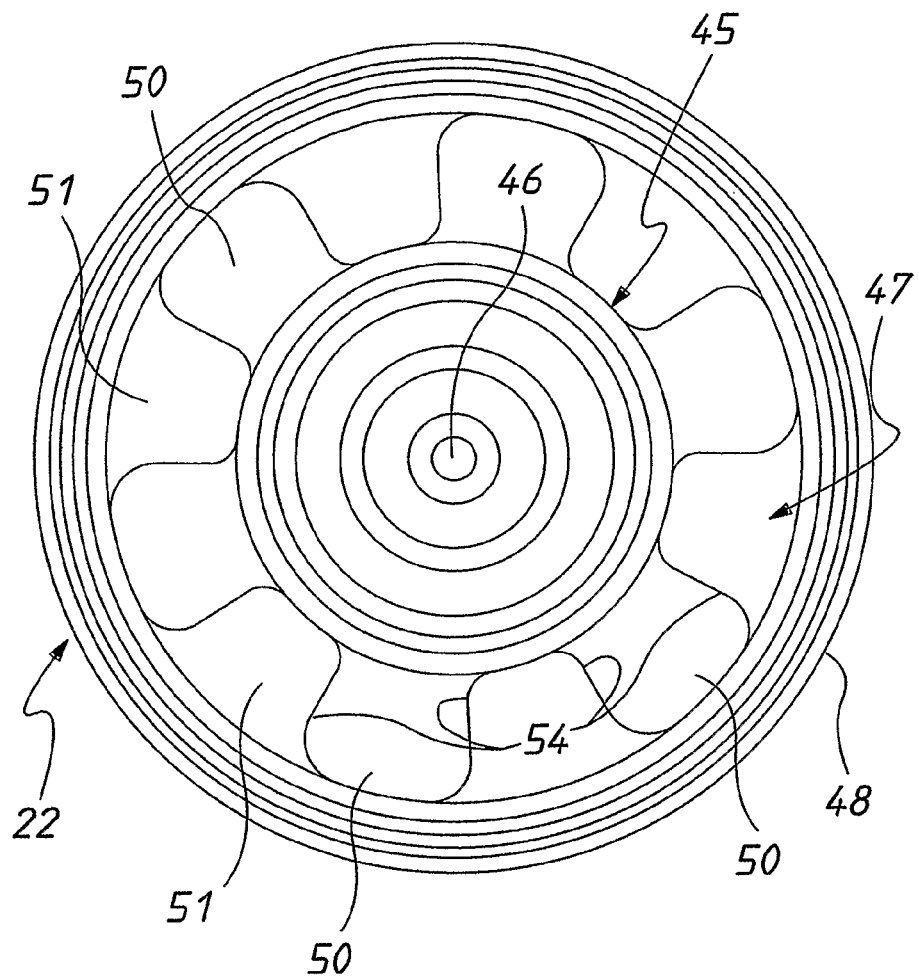
FIG. 6 is a schematic plan view of a diaphragm employed in a pump of FIG. 1.
Figure 7:
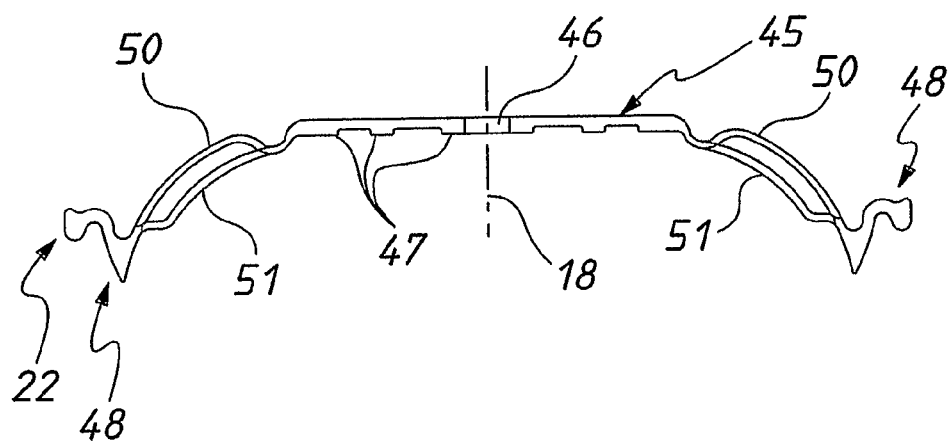
FIG. 7 is a schematic sectioned side elevation of the diaphragm of FIG. 6.
Figure 8:
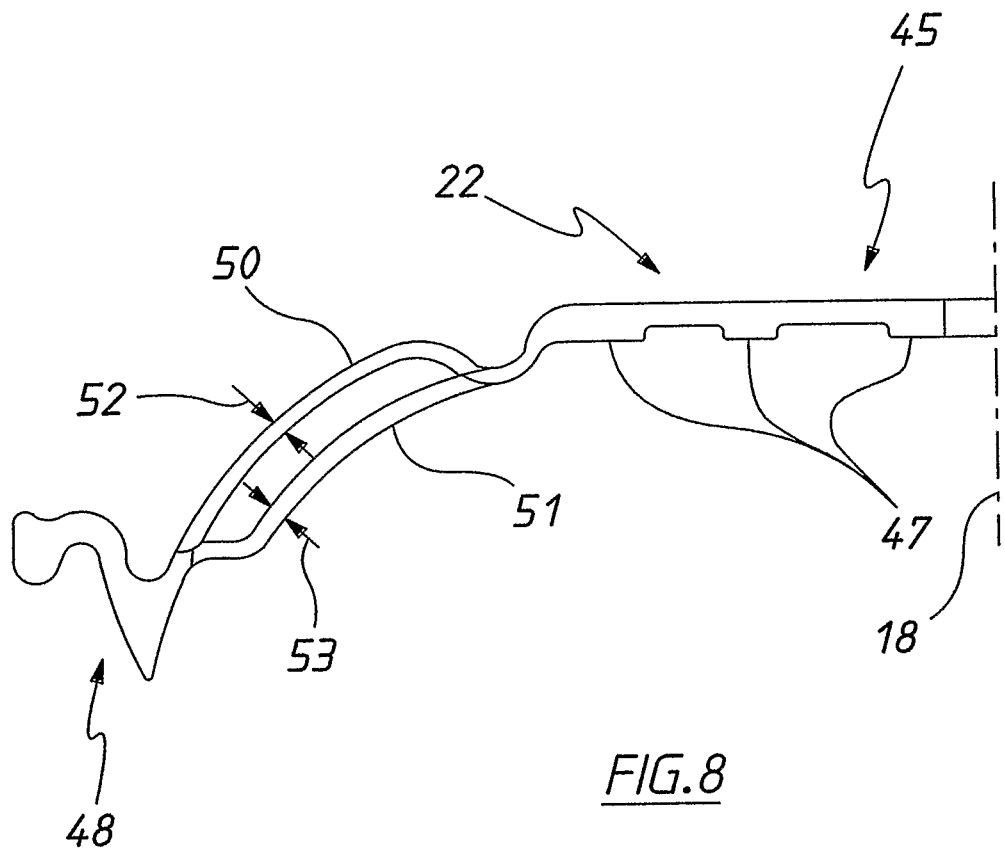
FIG. 8 is a schematic enlarged sectioned elevation of portion of the diaphragm as shown in FIG. 7.
Figure 9:
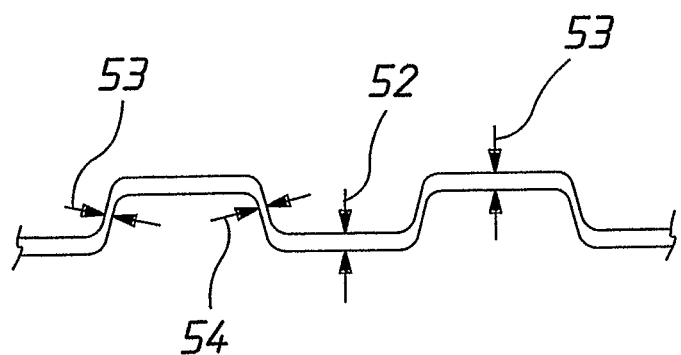
FIG. 9 is a schematic enlarged sectioned elevation of portion of the diaphragm as shown in Figure.

As best seen in FIG. 6, the segments 51 also extend angularly about the axis 18.

Each diaphragm 22 is integrally formed from the resiliently plastics material.

Preferably, each valve 30 and each diaphragm 22 is molded from resilient plastics material.

In operation of the above described pump 10 a working fluid under pressure is alternatively delivered to the first sub-chambers 23 by operation of a valve 25. This causes reciprocation of the piston assembly 14 thereby varying the volume of the sub-chambers 23 as well as the sub-chambers 24. A fluid being pumped is delivered to the inlet 26 wherefrom it flows to the sub-chambers 24 from the one-way valves 30. The fluid being pumped is drawn into each sub-chamber 24 as the volume thereof is being increased. As the volume of each sub-chamber 24 decreases the fluid being pumped is delivered to the outlet 27 again via the associated one-way valve 30.

The one-way valves 30 are located at an appropriate orientation to provide for flow in an inlet direction or an outlet direction depending on their location for the purposes of providing for fluid through the pump 10.

Each piston 15 includes a mounting flange 55 and an associated clamp plate 56 secured thereto so that the base 45 of the associated diaphragm is clamped between the associated mounting flange 55 and clamp plate 56.

Although the invention has been described with reference to specific examples, it will be appreciated by those skilled in the art that the invention may be embodied in many other forms.

The invention claimed is:

1. A pump comprising:
a pump body providing a pump chamber, an inlet valve seat and an outlet valve seat providing for flow of a pumped liquid in and out of the chamber;
a piston movably mounted in the pump body for reciprocation relative to the pump body; a diaphragm sealingly connecting the piston to the pump body so as to divide said chamber into a first sub-chamber and a second sub-chamber;
an inlet manifold providing first ducting, said first ducting being in communication with said first sub-chamber to provide for the flow of the pumped liquid to and from said first sub-chamber from said inlet valve seat;
an outlet manifold providing second ducting, the second ducting providing for flow of the pumped liquid from the first sub-chamber via the outlet valve seat;
third ducting, said third ducting being in communication with said second sub-chamber to provide for the flow of a working fluid to and from said second sub-chamber to cause the reciprocation of said piston;
a first valve associated with said first ducting and upstream of said first sub-chamber so as to be located between the inlet valve seat and first sub-chamber, and a second valve associated with said second ducting so as to be located downstream of said first sub-chamber, the first and second valves governing the flow of the pumped liquid to and from said first sub-chamber to cause the pumped liquid to move in a pumped direction; and wherein
each valve is integrally formed of plastics material and includes:
an elongated base sealingly connecting, and coupled between, the pump body and a respective manifold, the base being of a looped configuration and comprising an elongated aperture so as to have a pair of transversely spaced elongated longitudinal side portions joined by longitudinally spaced transverse end portions;
a movable valve member located adjacent one of said end portions and configured to sealingly cooperate with a respective valve seat of the pump body to close a valve opening provided by the respective seat;
a flexible bridge coupling the movable valve member with said one end portion providing, for movement of the valve member by resilient deformation of the bridge; and with said first ducting extending from the inlet valve seat to the first sub-chamber so that the valve associated with the inlet valve seat is located between the inlet valve seat and the first sub-chamber.

2. The pump of claim 1, wherein said bridge includes a first bridge portion and a second bridge portion, the bridge portions being transversely spaced.

3. The pump of claim 1, wherein said side portions are substantially co-extensive and said end portions are substantially co-extensive.

4. The pump of claim 1, wherein said end portions are arcuate in configuration.

5. The pump of claim 1, wherein said base in transverse cross-section is arcuate so as to provide a concave surface and a convex surface.

6. The pump of claim 3, wherein said base in transverse cross-section is of a "C" configuration.

7. The pump of claim 3, wherein said bridge provides a pivot axis extending generally transverse relative to said base.

8. The pump of claim 1, wherein the second ducting extends downstream from the second valve seat to an outlet.

9. The pump of claim 1, wherein an inlet extends to the inlet valve seat.

* * * * *